(12) United States Patent
Sneddon

(10) Patent No.: US 9,234,530 B1
(45) Date of Patent: Jan. 12, 2016

(54) THERMAL ENERGY RECOVERY

(71) Applicant: Exelis Inc., McLean, VA (US)

(72) Inventor: Keith C. Sneddon, Sayville, NY (US)

(73) Assignee: Exelis Inc., Herndon, VA (US)

( * ) Notice: Subject to any disclaimer, the term of this patent is extended or adjusted under 35 U.S.C. 154(b) by 507 days.

(21) Appl. No.: 13/798,259

(22) Filed: Mar. 13, 2013

(51) Int. Cl.
 *F15B 1/027* (2006.01)
 *F28D 19/00* (2006.01)
 *F15B 1/02* (2006.01)
 *F28D 15/00* (2006.01)
 *B60T 8/44* (2006.01)

(52) U.S. Cl.
 CPC ............... *F15B 1/025* (2013.01); *F28D 15/00* (2013.01); *F28D 19/00* (2013.01); *B60T 8/443* (2013.01)

(58) Field of Classification Search
 CPC ......... F28D 15/00; F28D 19/00; F28D 20/00; F28D 20/0034; F28D 21/00; F28D 2020/006; F28D 2020/0078; F28D 2020/0082; F28D 2020/0095; F28D 2020/0086; F28D 2021/008; B60T 8/443; B60T 1/10; B60W 30/18127; Y02T 10/90; F15B 1/025
 USPC ................... 417/243; 418/83, 206.3; 280/212; 180/165; 60/408, 413, 414, 419
 See application file for complete search history.

(56) References Cited

U.S. PATENT DOCUMENTS

| | | | | |
|---|---|---|---|---|
| 2,942,411 | A * | 6/1960 | Hutchings | F01K 3/006 126/643 |
| 3,379,008 | A * | 4/1968 | Manganaro | B60K 17/10 180/302 |
| 3,715,887 | A * | 2/1973 | Weatherly et al. | C01B 21/26 422/510 |
| 3,892,283 | A * | 7/1975 | Johnson | B60K 6/12 180/165 |
| 3,903,696 | A * | 9/1975 | Carman | B60K 6/12 180/165 |
| 3,986,575 | A * | 10/1976 | Eggmann | B60K 3/04 180/301 |
| 4,018,052 | A * | 4/1977 | Laussermair | B60K 6/105 475/267 |
| 4,060,987 | A * | 12/1977 | Fisch | B60K 3/04 415/141 |
| 4,132,283 | A * | 1/1979 | McCurry | B60K 6/12 180/165 |
| 4,150,547 | A * | 4/1979 | Hobson | F02C 6/16 165/45 |
| 4,275,310 | A * | 6/1981 | Summers | F01K 21/04 290/1 R |
| 4,281,256 | A * | 7/1981 | Ahrens | F02C 6/16 290/1 R |

(Continued)

FOREIGN PATENT DOCUMENTS

SE WO 8701993 A1 * 4/1987 ............... B60K 6/12

*Primary Examiner* — Tho V Duong
*Assistant Examiner* — Aaron Isenstadt
(74) *Attorney, Agent, or Firm* — Edell, Shapiro & Finnan LLC

(57) ABSTRACT

Towards recovering thermal energy, an accumulator buffers a working fluid over an energy recovery cycle that includes two processes: one in which working fluid is accumulated in the accumulator at increasing pressure and the other that draws working fluid from the accumulator at decreasing pressure. Heat storage fluid is displaced in a storage fluid conduit towards a heat storage region in response to increasing pressure in the accumulator and towards a reservoir region in response to decreasing pressure in the accumulator. One or more heat exchange conduits traverse the storage fluid conduit to come in thermal contact with the heat storage fluid where they transfer heat to the heat storage fluid during the first process of the energy recovery cycle and transfer heat from the heat storage fluid during the other process.

13 Claims, 7 Drawing Sheets

(56) References Cited

U.S. PATENT DOCUMENTS

| | | | | |
|---|---|---|---|---|
| 4,765,142 A * | 8/1988 | Nakhamkin | | F01K 21/047 60/652 |
| 4,798,053 A * | 1/1989 | Chang | | B60K 6/12 180/165 |
| 5,549,174 A * | 8/1996 | Reis | | B60K 6/12 180/165 |
| 6,145,311 A * | 11/2000 | Cyphelly | | F15B 11/0725 417/258 |
| 6,938,417 B2 * | 9/2005 | Watanabe | | F02C 6/18 60/39.182 |
| 7,086,231 B2 * | 8/2006 | Pinkerton | | F02C 1/05 60/650 |
| 7,793,496 B2 * | 9/2010 | Rampen | | B60K 6/12 60/414 |
| 7,832,207 B2 * | 11/2010 | McBride | | F15B 1/024 60/410 |
| 8,037,678 B2 * | 10/2011 | McBride | | F15B 1/024 60/412 |
| 8,046,990 B2 * | 11/2011 | Bollinger | | H02J 15/006 60/410 |
| 8,117,842 B2 * | 2/2012 | McBride | | F04B 17/03 60/613 |
| 8,246,318 B2 * | 8/2012 | Tanaka | | F28D 9/00 165/262 |
| 2010/0100278 A1 * | 4/2010 | Saito | | B60T 1/10 701/29.2 |
| 2012/0168126 A1 * | 7/2012 | Tanaka | | F28D 20/025 165/104.11 |
| 2013/0146000 A1 * | 6/2013 | Choi | | F28D 20/02 123/41.14 |

* cited by examiner

THERMAL ENERGY RECOVERY

TECHNICAL FIELD

The present general inventive concept relates to thermal energy recovery.

BACKGROUND

Energy recovery, as used herein, encompasses a variety of techniques by which energy is transferred from one subsystem of a larger system to another in order to minimize the amount of energy that must be input to the system for it to perform its function. Energy recovery systems are being developed to counter increasing energy costs and to reduce pollutants and greenhouse gasses. Certain of these energy recovery techniques are referred to as "regenerative," meaning that energy is stored and then reapplied to do work. The most widespread example of this technology can be found in braking regeneration systems. These systems produce energy during braking in a way that can be readily stored, e.g., as electrical energy or hydraulic compression, as opposed to employing friction to brake, which generates heat that is usually just released into the brake's surroundings. The stored energy can be used to later supplement engine power, thereby effecting an improvement in overall fuel efficiency.

Recent advances in high pressure (6000-8000 psi), ruggedized, safe pneumatic components and subsystems have made pneumatic energy recovery a practical option, in many cases compressed air is used both as the energy storage medium and the working medium. Pneumatic energy recovery systems are generally smaller, lighter, and simpler than either of their electric or hydraulic counterparts.

A pneumatic energy recovery system, in its purest sense, has an optimized air compressor to store energy in the form of compressed air and a complementary air motor that operates on the expansion of air so as to utilize the stored energy in the compressed air to do work. The optimal configuration is a unified compressor and motor that can run in both directions, i.e., as a compressor and a motor, to implement thermodynamically reversible processes to the fullest extent practicable.

To ensure longevity, high performance and structural integrity of a combined compressor/motor, expanding and compressing gas must not exceed temperatures that cause component breakdown and the ability to shed heat is key to performance. While shedding heat in a compressor is one thing, increasing the temperature to expand air more efficiently in an air motor is typically overlooked, since such requires an additional energy source from which heat can be transferred. The development of thermal energy recovery techniques in a broader energy recovery context, such as in pneumatic regeneration systems must clearly be advanced.

SUMMARY

The present general inventive concept recovers thermal energy as part of a larger energy recovery scheme.

Certain aspects of the present general inventive concept implement thermal recovery through an accumulator that buffers a working fluid over an energy recovery cycle that includes a process in which working fluid is accumulated in the accumulator at increasing pressure. The energy recovery cycle includes another process that draws working fluid from the accumulator at decreasing pressure. A storage fluid conduit is in communication with the accumulator and stores an amount of a heat storage fluid. The heat storage fluid is displaced in the storage fluid conduit towards a heat storage region in response to increasing pressure of the working fluid in the accumulator. In response to decreasing pressure of the working fluid in the accumulator, the heat storage fluid is displaced within the storage conduit to a reservoir region. One or more heat exchange conduits traverse a boundary of the storage fluid conduit to come in thermal contact with the heat storage fluid. The heat exchange conduits convey the working fluid to transfer heat to the heat storage fluid during the process of the energy recovery cycle and to transfer heat from the heat storage fluid during the other process of the energy recovery cycle.

These and other objects, features and advantages of the present general inventive concept will be apparent from the following detailed description of illustrative embodiments thereof, which is to be read in connection with the accompanying drawings.

DESCRIPTION OF EXAMPLE EMBODIMENTS

Figure 1A:
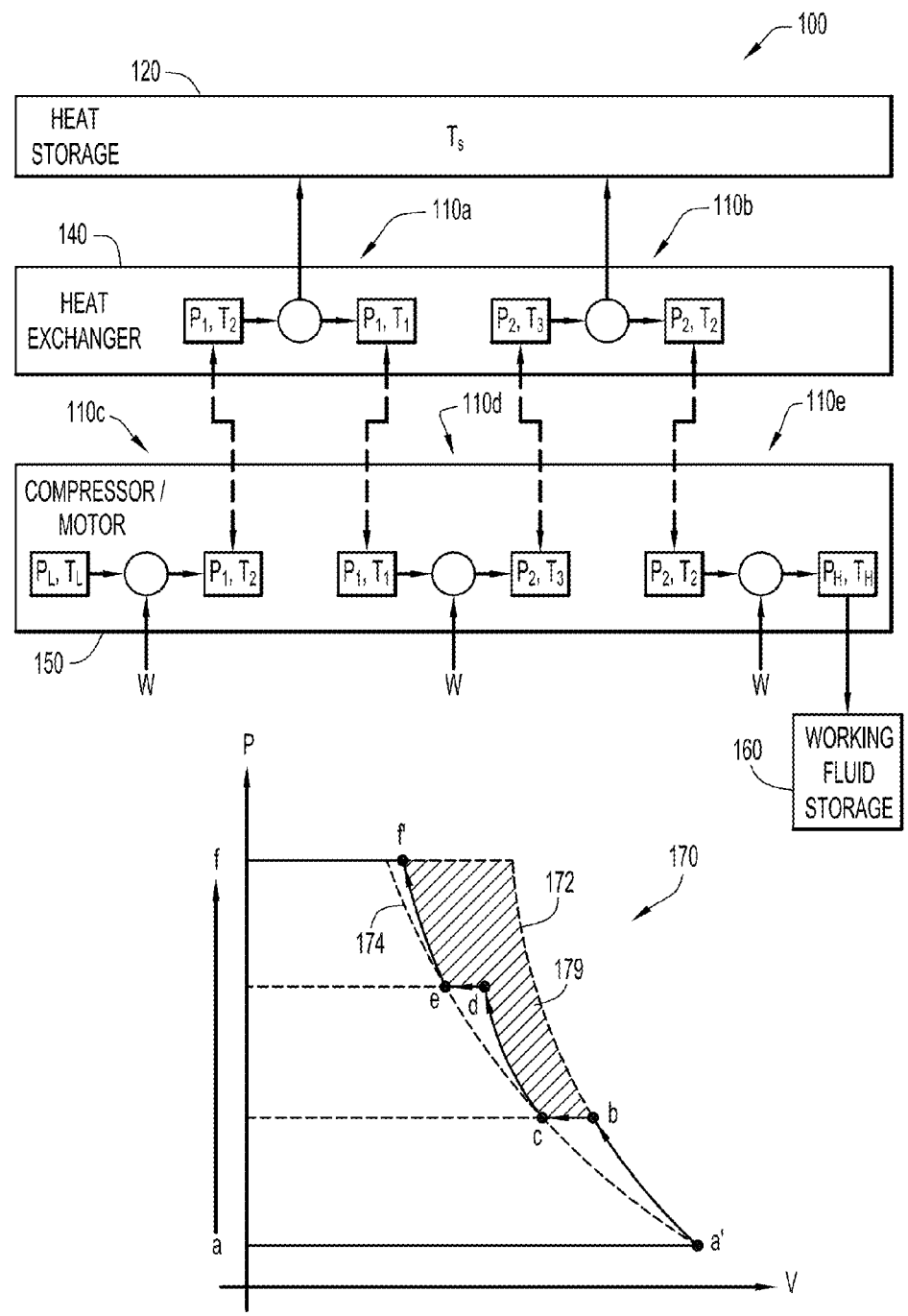
FIGS. 1A-1B are functional diagrams illustrating thermal energy recovery in a broader energy recovery context in embodiments of the present general inventive concept.

The present general inventive concept is best described through certain embodiments thereof, which are described in detail herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

Additionally, the word exemplary, when used herein, is intended to mean "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Mathematical expressions are contained herein and those principles conveyed thereby are to be taken as being thoroughly described therewith. It is to be understood that where mathematics are used, such is for succinct description of the underlying principles being explained and, unless otherwise expressed, no other purpose is implied or should be inferred. It will be clear from this disclosure overall how the mathematics herein pertain to the present invention and, where embodiment of the principles underlying the mathematical expressions is intended, the ordinarily skilled artisan will recognize numerous techniques to carry out physical manifestations of the principles being mathematically expressed.

Figure 1B:
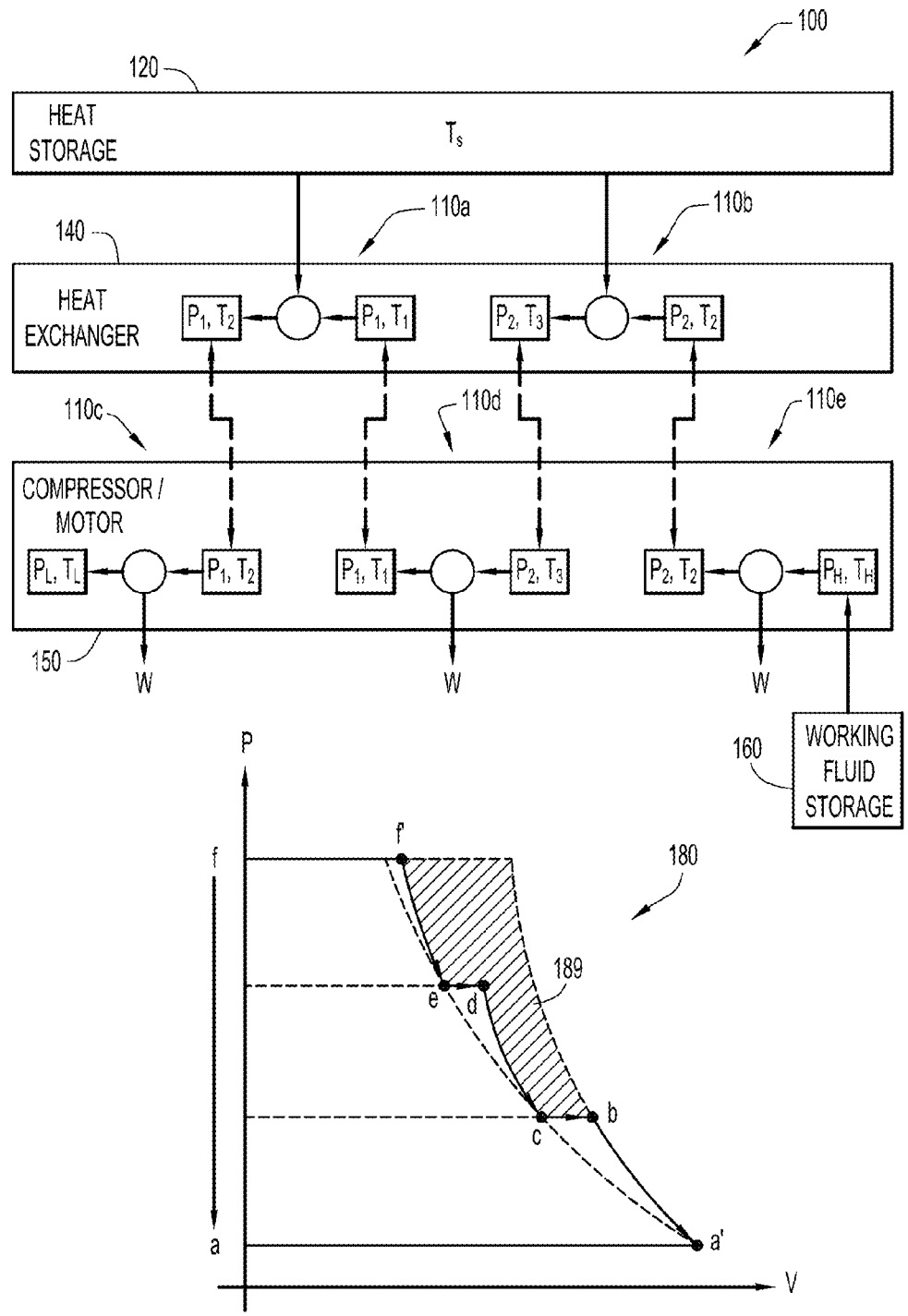

FIGS. 1A-1B are illustrations of an energy recovery system 100 in which thermal energy recovery may be implemented by embodiments of the present invention. Broadly, energy recovery system 100 can be viewed as being carried out by a plurality of thermodynamic engines 110a-110e, representatively referred to herein as thermodynamic engine(s) 110, which, as used herein, is an abstraction to refer to any mechanism by which a change in a thermodynamic state, e.g., pressure, volume, temperature, etc., is effected through a transfer of energy, either as heat or by work. While thermodynamic engines 110 are illustrated to have similar appearance and are referenced in the illustration by common numeric indicators, thermodynamic engines may each operate under different process variables by entirely different mechanisms. The present invention is not limited to any particular physical manifestation of thermodynamic engines 110; the skilled artisan will recognize numerous possible mechanisms that can be used to embody the present invention without departing from its intended spirit or scope. Indeed, it is to be understood that the use of the word "engine" is not strictly intended to mean "heat engine" in the traditional sense, although such an implementation of thermodynamic engines 110 is one possibility.

Thermodynamically, energy recovery system 100 is an open system where, in one process, i.e., that illustrated in FIG. 1A, work is done on the system, such as by a shaft of compressor/motor 150 being externally driven, to compress a working fluid and to store the compressed fluid in a suitable working fluid storage facility 160. In another process, i.e., the internal energy of the compressed working fluid stored in working fluid storage 160 is used by energy recovery system 100 to do work on its surroundings, such as to drive the shaft of compressor/motor 150. Accordingly, the process illustrated in FIG. 1A will be referred to as occurring while energy recovery system 100 is in compressor mode while the process illustrated in FIG. 1B will be referred to as occurring while energy recovery system 100 is in motor mode. However, this nomenclature is not intended to restrict the present invention to a particular application.

As illustrated in FIGS. 1A-1B, collectively referred to herein as FIG. 1 where no distinction is necessary, energy recovery system 100 is realized through a few basic components: compressor/motor 150, heat exchanger 140, heat storage facility 120 and working fluid storage facility 160. Again, these components are abstractions that can be physically realized in a number of different ways, as the ordinarily skilled artisan will recognize and appreciate upon review of this disclosure. Compressor/motor 150 converts energy from mechanical work W to compress a working fluid from a low pressure $P_L$ to a high pressure $P_H$, and to store the high pressure working fluid in working fluid storage 160. This change in pressure carries with it a change in temperature from a low temperature $T_L$ to a high temperature $T_H$. Heat exchanger 140 minimizes the difference between temperatures $T_L$ and $T_H$ by transferring heat to heat storage unit 140 to raise the temperature $T_S$ of a heat storage medium. As will be discussed in detail below, minimizing the difference between temperatures $T_L$ and $T_H$ can improve the efficiency of compressor/motor 150. In the reverse operation, the pressure of the working fluid stored in working fluid storage 160 is reduced from $P_H$ to $P_L$ in compressor/motor 150 to perform work W, which also causes a change in temperature from $T_H$ to $T_L$. Heat exchanger 140, to likewise improve efficiency, transfers heat to compressor/motor 150 to minimize the difference between temperature $T_H$ and $T_L$. Of course, this description, as well as others herein, excludes consideration of system losses, but such losses are readily recognized by the skilled artisan and discussion of such is not necessary to practice the invention through its many possible embodiments. It is to be understood, however, that many modifications to embodiments described herein may be realized to minimize such system losses and other non-ideal behavior and the scope of the present invention is intended to encompass such variations.

Referring to FIG. 1A, thermodynamic process 170 is described for compressor mode operation of energy recovery system 100. Process 170 increases the pressure of the working fluid from $P_L$, indicated in the pressure-volume (PV) state diagram at 170a, to a pressure $P_H$ indicated at 170f. In the illustrated embodiment, this change in pressure is achieved in stages, represented by thermodynamic engines 110c-110e by mechanical work W. It is to be understood that while only three stages are illustrated, the present invention is not so limited. Additionally, while is it illustrated that work W is done on each stage 110c-110e, such work may be derived from a common mechanism.

In stage 110c, work is done on the working fluid to increase the pressure by an increment $\Delta P_c = P_1 - P_L$, corresponding to path 170a' to 170b in process 170, where the subscript on the increment notation refers to the thermodynamic engine 110 by which the increment is achieved. The increase in pressure causes an incremental increase in temperature $\Delta T_c = T_2 - T_L$. Thermodynamic engine 110a in heat exchanger 140 transfers heat from the working fluid to the heat storage medium in heat storage 120 to reduce the temperature by an increment $\Delta T_a = T_1 - T_2$, which, to be noted, is a negative value. If held at constant pressure, this change in temperature $\Delta T_c$ compels a change in volume of the working fluid, by which less effort is required to transfer the working fluid into a smaller working volume of subsequent compressor stage 110d. The skilled artisan will recognize this process as similar to "intercooling" in a multistage compressor. The change in temperature and corresponding change in volume occur nearly isobarically, as illustrated at process path 170b-170c. Compression/heat exchange processes similar to that just described are performed in process 170 to obtain a final working fluid pressure. That is, a change of pressure $\Delta P_d = P_2 - P_1$ and temperature $\Delta T_d = T_3 - T_1$ may be brought about at stage 110d, as indicated at process path 170c-170d. Subsequently, a change in temperature $\Delta T_b = T_2 - T_3$ is achieved by heat transfer in thermodynamic engine 110b, which causes a decrease in volume of the working fluid. This concurrent change of thermodynamic state is indicated at process path 170d-170e. The working fluid is compressed to its final pressure $P_H$ by a incremental increase $\Delta P_e = P_H - P_2$ and increase in temperature $\Delta T_e = T_H - T_2$, as indicated at process path 170e-170f. The working fluid may then be transferred at this pressure $P_H$ and temperature $T_H$ to working fluid storage 160.

As stated above, minimizing the difference between temperatures TH and TL may improve the efficiency of energy recovery system 100. In the PV diagram of FIG. 1A, curve 172 indicates an adiabatic path that might be traversed without the multistage compression/intercooling operation described above and curve 174 indicates a isothermal path that might be traversed in an ideal case. The difference between these two paths represents the difference between the amount of work that be done to achieve the same final pressure. Thus, the shaded area 179 corresponds to an amount of work that need not be done on energy recovery system 100 as compared to a system in which a single stage compressor might be employed. More significantly, however, is that in accordance with the present invention, stored heat can be provided to the working fluid to achieve similar energy savings when energy recovery system 100 is in the motor mode of operation, as described with reference to FIG. 1B.

Motor mode process 180 of energy recovery system 100 is essentially the reverse of process 170 and, ideally if such were possible, would be exactly the reverse process. In the exactly reverse process, energy system 100 would be capable doing the same work for a given amount of pressurized working fluid that was done on the system to store that amount of working fluid. For purposes of understanding the basic principles of the processes of the energy recovery cycle, which consists of process 170 and complementary process 180, embodiments of the present invention seek to implement motor mode process 180 as the reverse of compression mode process 170 to the extent possible and, as such, the explanation of motor mode process will be abbreviated. The ordinarily skilled artisan will recognize and appreciate the impediments to achieving the perfectly reverse thermodynamic path without an accounting thereof in the present explanation.

Motor mode process 180 converts the energy stored as pressure of the working fluid stored in working fluid storage 160 to kinetic energy of work W. Thus, at the completion of the process, the pressure of the working fluid drops from pressure PH, indicated at state 180*f* in the PV diagram, to a pressure PL indicated at state 180*a*. The work is done over stages by thermodynamic engines 110*c*-110*e*, such as by incrementally rotating a shaft by means of a crankshaft, although the present invention is not so limited. In complementary fashion to the volumetric compression by heat transfer between each stage 110*c*-110*e*, a volumetric expansion occurs in motor mode process 180 by transferring heat from heat storage 120 to the working fluid through thermodynamic engines 110*a*-110*b* as the working fluid proceeds through stages 110*c*-110*e*. Thus, in a reverse manner to that explained above, stages 110*e*-110*c* do work through volumetric expansion with a corresponding drop in pressure and temperature as indicated at paths 180*f*-180*e*, 180*d*-180*c* and 180*b*-180*a'*, respectively. In concert with the transfer of the working fluid through stages 110*e*-110*c*, thermodynamic engines 110*b*-110*a* add heat to the working fluid to cause isobaric expansion of the working fluid as indicated at paths 180*e*-180*d* and 180*c*-180*b*.

The physical manifestation of thermodynamic engines 110*a* and 110*b* dictate to a great extent the efficiency of energy recovery system 100. Any implementation must be adapted to the heat storage medium used in heat storage 120 and to transfer heat in an efficient manner. Additionally, thermodynamic engines 110*a* and 110*b* are to transfer heat in both directions across the working fluid/heat storage medium boundary, which requires that the heat storage medium must be colder than the temperature of the working fluid at respective thermodynamic engines 110*a* and 110*b* during compression mode process 170 and hotter than the working fluid at respective thermodynamic engines 110*a* and 110*b* during motor mode process 180. While there are many ways to achieve these conditions, not all solutions are suitable for energy recovery. That is, energy that is consumed to compel a particular process to occur cannot be stored as recovered energy.

Figure 2:
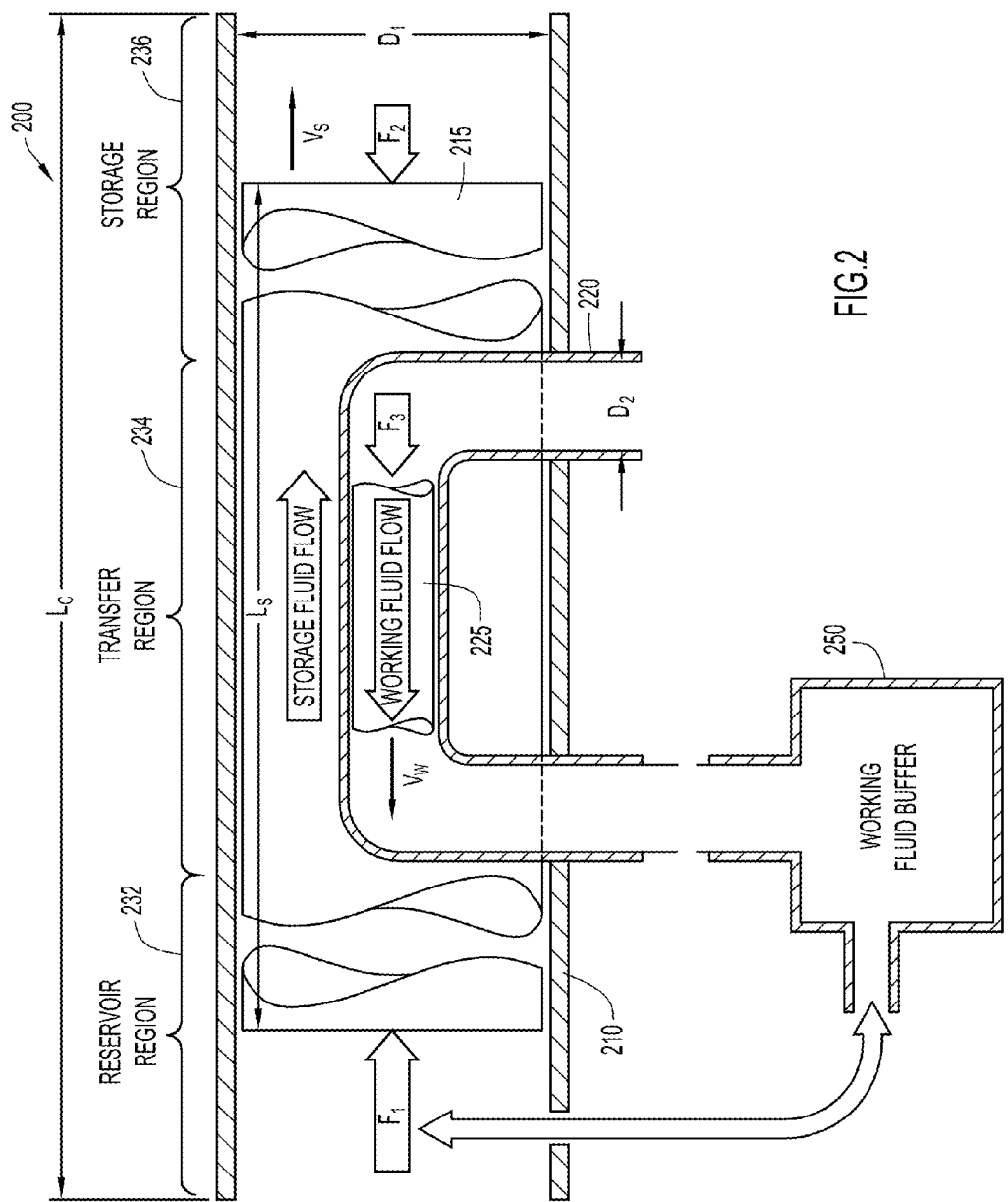
FIG. 2 is a diagram illustrating mechanisms by which heat exchange and heat storage may be implemented in embodiments of the present invention.

FIG. 2 is a diagram illustrating mechanisms by which heat exchange and heat storage may be implemented in embodiments of the present invention. As used herein, these mechanisms together form a thermal energy recovery system 200 and perform a thermal recovery process. It is to be understood that the illustration of FIG. 2 is composed for purposes of explaining the invention in an implementation-neutral context and, as such, various mechanisms to enhance the thermal recovery process, such as fins, etc., are not illustrated in the figure. The skilled artisan will recognize numerous techniques and physical structures by which the system illustrated in FIG. 2 can be made more efficient, some of which are described below. The scope of applicability of the present invention is intended encompass all such implementation details.

In the thermal energy recovery system 200 of FIG. 2, a thermal energy storage fluid 215 is chosen to have properties to meet the application in which the present invention is embodied. To meet the bi-directional flow of heat described above, the material chosen for storage fluid 215 should be suitable for service as both a heat exchange medium and a heat storage medium. Both of these conditions can be met with a material that has a high specific heat capacity. Water has a particularly high specific heat density, but has a narrow operating range, i.e., water has phase transition boundaries at 0° C. and 100° C. While the present invention is not limited to a particular storage fluid 215, water will be assumed in the embodiments described below and techniques that ameliorate the narrow operating range of water as storage fluid 215 are described below as well.

As illustrated in FIG. 2, an amount of storage fluid 215 is contained in a conduit 210. In certain embodiments, the amount of storage fluid is fixed in that it does not change over time. In the illustrated example, the amount of storage fluid 215 in conduit 210 is $\rho_S V_S$ where $\rho_S$ is the density of storage fluid 215 and $V_S$ is the volume of the fluid. Diagrammatically, the amount of storage fluid 215 in conduit 210 is represented by the fluid column having diameter D1 and length $L_S$. The amount of storage fluid 215 should be carefully considered in view not only of the number of different roles it must fulfill thermodynamically, but also in view of the mechanics of thermal recovery system 200, as will be discussed further below and the constraints on the platform in which thermal recovery system 200 is implemented.

Conduit 210 may have a length $L_C$ that is greater than the length $L_S$ of the column of storage fluid 215 so that storage fluid 215 can be displaced therein. Conduit 210 may be delineated into three regions: a reservoir region 232, a transfer region 234 and a storage region 236. This delineation should not be construed as defining specific boundaries; the extent of these regions extends to the limits of the effects of the processes occurring in and around these regions. However, certain embodiments of the invention impose physical boundaries to enforce a separation of storage fluid 215 by various thermodynamic states, such as temperature. Generally, storage fluid 215 in reservoir region 232 is colder than that in storage region 236 and desirably, storage fluid 215 in reservoir region 232 will be at the lowest temperature available for the given system, such as the platform ambient temperature, and storage fluid 215 in storage region 236 will be the maximum temperature achievable through heat transfer from working fluid. The relative lengths $L_C$ and $L_S$ may be such that, at any moment in time, either of reservoir region 232 or storage region 236 may be empty, in which case the other of storage region 236 or reservoir region 232 is not empty. Transfer region 234 may always be occupied by storage fluid 215 and, as such, storage fluid 215 in transfer region 234 may form a part of the heat storage mass, as will be clear from discussions below.

A conduit 220 of diameter $D_2 < D_1$ may traverse the boundary of conduit 210 so as to be in thermal contact with storage fluid 215. A working fluid 225 may flow through conduit 220 under the influence of a motivating force $\vec{F}_3$. Heat flows across the boundary of conduit 220 either to storage fluid 215 or to working fluid 225 depending on the process of the energy recovery cycle that is active.

As illustrated in FIG. 2, opposing forces $\vec{F}_1$ and $\vec{F}_2$ may be applied to establish a net force $\vec{F}_S = \vec{F}_1 - \vec{F}_2$ on storage fluid 215. Forces $\vec{F}_1$ and $\vec{F}_2$ can be dynamically controlled so that the net force $\vec{F}_S$ applies a specific level of pressure on storage fluid 215 and at the same time motivates storage fluid 215 through conduit 210 in a specific direction. For example, in the configuration illustrated in FIG. 2, net force $\vec{F}_S$ compels storage fluid to flow towards storage region 236 and heat is transferred from working fluid 225 to storage fluid 215. This transfer corresponds to the compression mode process of the energy recovery cycle described with reference to FIG. 1 and results in an energy gain, i.e., a net increase of thermal energy in storage fluid 215. In the motor mode of the energy recovery cycle, heat is transferred from storage fluid 215 to working fluid 225, which results in energy depletion, i.e., a net decrease of thermal energy in storage fluid 215 has occurred.

For purpose of describing thermal energy recovery system 200, an arbitrary initial state is assumed, i.e., that at an initial time $t_0^-$, reservoir region 232 is substantially occupied by storage fluid 215 and that the temperature of storage fluid 215 in reservoir region 232 is $T_A$. Additionally, it is to be assumed that transfer region 234 is also occupied by storage fluid 215, also at temperature $T_A$, and that storage region 236 is substantially empty. At time $t_0$, a compression mode process begins and, accordingly, working fluid 225 begins to flow in conduit 220 in a direction indicated by the working fluid flow direction arrow at a velocity $\vec{v}_W$ owing to the influence of $\vec{F}_3$. It is to be assumed that working fluid 225 is at a temperature $T_C > T_A$ when it traverses the boundary of conduit 210. Accordingly, heat is transferred by conduction across the boundary of conduit 220 from working fluid 225 to storage fluid 215 and the temperature of storage fluid 215 in transfer region 234 begins to rise. At time $t_1 \geq t_0$, forces $\vec{F}_1$ and $\vec{F}_2$ are applied at relative magnitudes so that storage fluid 215 is compelled to move through conduit 210 at a velocity $\vec{v}_S$ in the flow direction indicated by the storage fluid flow direction arrow illustrated in FIG. 2. Such flow establishes forced convection, for purposes of transferring heat more efficiently, while also moving the heated storage fluid 215 into storage region 236. In certain embodiments, forces $\vec{F}_1$, $\vec{F}_2$ and $\vec{F}_3$ are controlled to establish a mass flow rate in each of working fluid 225 and storage fluid 225 by which maximum heat transfer can be achieved for the specific heat capacities of each fluid. Additionally, pressure applied by forces $\vec{F}_1$ and $\vec{F}_2$ may be made sufficient to prevent a phase change in storage fluid 215, thereby extending its operating range as a heat exchange/heat storage medium. That is, as the temperature increases in storage fluid 215, so too does the pressure if the volume is kept constant by forces $\vec{F}_1$ and $\vec{F}_2$ and, of course, the containing walls of conduit 210. If sufficient pressure builds in water, for example, it can become superheated rather than undergoing a phase change to vapor. As such, added heat will continue to increase its temperature, at least up to the point where the fluid becomes critical.

At time $t_2 > t_1$, the compressor mode process terminates at which time $\vec{F}_3$ becomes zero and the flow of working fluid 225 ceases. At time $t_3 \geq t_2$, flow of storage fluid 215 is terminated by asserting $\vec{F}_1 = \vec{F}_2$. In this condition, heated storage fluid 215 is held in storage region 236 and heat transfer will continue in transfer region 234 until thermal equilibrium is reached between the walls of conduit 220 and storage fluid 215. Thermal energy recovery system 200 remains in this condition until, at time $t_4 > t_3$, the energy recovery cycle enters its motor mode process, and the operation of thermal recovery system 200 is reversed.

Figure 3:
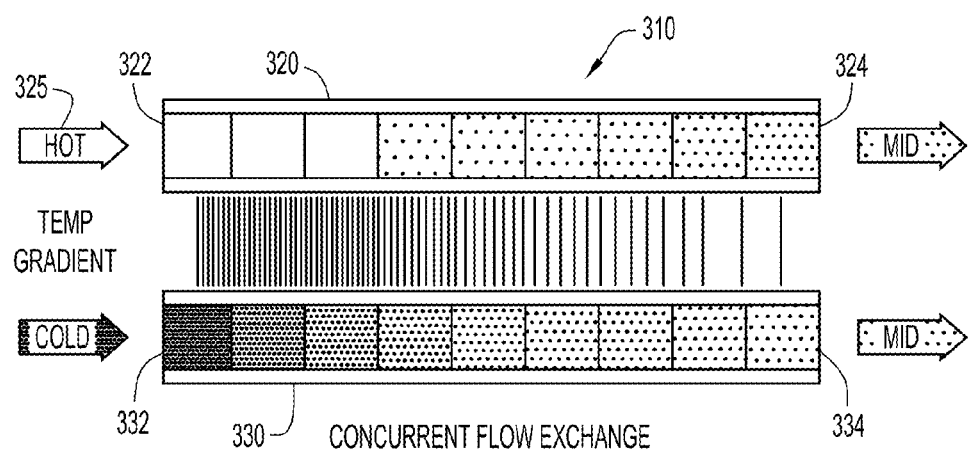
FIG. 3 is a diagram illustrating countercurrent flow heat exchange as implemented in embodiments of the present general inventive concept.
Figure 3:
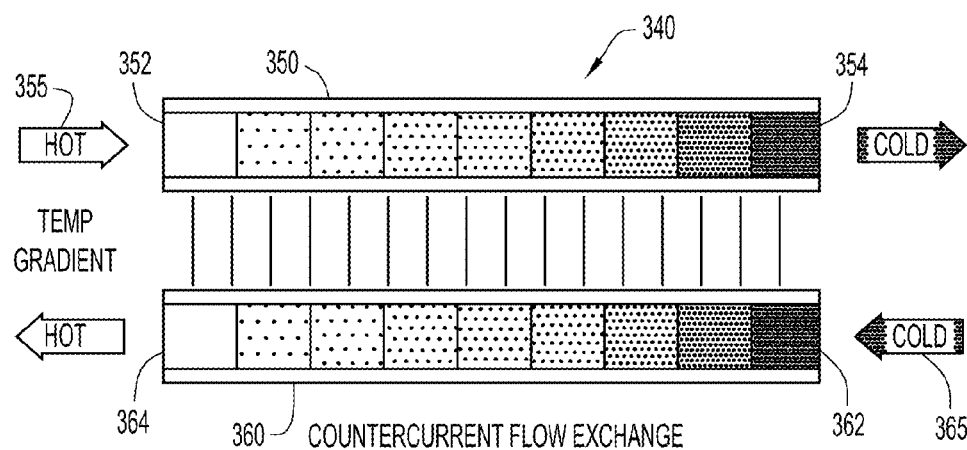

In certain embodiments of the present invention, the flow directions of working fluid 225 and storage fluid 215 are in continual opposition, i.e., the flows are in opposite directions in both compressor and motor mode processes. This countercurrent exchange achieves greater heat transfer than can be obtained through concurrent flow heat exchange, i.e., where the fluids flow in the same direction. This is explained with reference to FIG. 3, where both concurrent and countercurrent heat exchange configurations are illustrated. In both the concurrent exchange case 310 and the countercurrent exchange case 340, flows are to be considered as being in thermal contact, despite being illustrated as being separated. It is to be assumed for purposes of the following discussion that both systems 310 and 340 are equivalent except for the flow direction and fluid entry points. It is to be assumed as well that a hot fluid and a cold fluid enter their respective conduits at a constant temperature, i.e., heat is not transferred to the respective fluid sources. Additionally, once the fluids exit their respective conduits, no further heat exchange occurs between the fluids. These assumptions and constraints are only imposed for purposes of analysis so that the differences between the two configurations are readily identified and understood.

In concurrent exchange configuration 310, the hot and cold fluids 325 and 335, respectively, enter at the same ends 322 and 332 of respective conduits 320 and 330 and flow in the same direction. Given the constraints above, the temperature gradient at the input ends 322 and 332 is constant and fixed by the entry temperatures of hot and cold fluids 325 and 335. Thus, at entry end 322 and 332, there is a substantial temperature gradient, as indicated by the parallel lines between conduits 320 and 330 (and conduits 350 and 360 in the countercurrent exchange case 340), where more closely spaced lines indicate a higher temperature gradient than lines that are separated further apart. During transport, heat is transferred from hot fluid 325 to cold fluid 335 along the lengths of conduits 320 and 330, thus causing an incremental temperature increase in cold fluid 335 and an incremental temperature decrease in hot fluid 325, which diminishes the temperature gradient between the two fluids along the lengths of conduits 320 and 330. This heat exchange continues as fluids 325 and 335 flow towards the exit ends of conduits 320 and 330, respectively, until at the exit end (assuming adequate lengths of the conduits), fluids 325 and 335 exit in thermal equilibrium at a temperature that is almost exactly midway between the original temperatures of hot fluid 325 and cold fluid 335 at entry ends 322 and 332. If thermal equilibrium is reached at a point along conduits 320 and 330 prior to fluids 325 and 335 reaching exit ends 324 and 334, no further heat transfer occurs from that point onward along the remaining length of conduits 320 and 330.

In the countercurrent exchange configuration 340, hot fluid 355 enters conduit 350 at an end 352 opposite end 362 at which cold fluid 365 enters conduit 360. Conduit 360 is thus always cold at its entry end 362 and conduit 350 is always hot at its entry end 352. During transport, heat is transferred from hot fluid 355 to cold fluid 365 thus causing an incremental increase in the temperature of cold fluid 365 along conduit 360 and a corresponding incremental decrease in the temperature of hot fluid 355 along conduit 350. However, in contradistinction to the concurrent exchange configuration 310, hot fluid 355 flows in the direction of the coldest point of conduit 360 and cold fluid 365 flows in the direction of the hottest point of conduit 350. Thus, the energy transferred across conduits at any point along conduits 350 and 360 is offset by material transport in both conduits 350 and 360 towards a lower and higher temperature, respectively, fixed by the entry temperatures of the two fluids. This results in a near constant temperature gradient along the entire lengths of conduits 350 and 360 and a corresponding constant transfer of heat along that entire length. Given sufficiently long conduit lengths, the exit temperature of fluid 355 is very near the entry temperature of cold fluid 365 and the exit temperature of fluid 365 is very near the entry temperature of hot fluid 355. From this first order analysis, it will be readily appreciated by the skilled artisan that the countercurrent exchange configuration 310 achieves greater heat transfer than the concurrent configuration 340.

Returning to FIG. 2, compelling storage fluid 215 and working fluid 225 into respective flows requires that work be done on these fluids. While the force $\vec{F}_3$ moving working fluid 225 is provided by compressor/motor 150, for example, the energy to impart forces $\vec{F}_1$ and $\vec{F}_2$ must be must somehow be provided. As indicated above, any energy consumed to do the work of these forces must be deducted from the energy recovered by energy recovery system 100. Thus, employing a pump or similar mechanism would be poor candidates for an efficient energy recovery implementation. Instead, certain embodiments of the present invention utilize the pressure of the working fluid 225 to displace storage fluid 215. A working fluid buffer 250 may contain an amount of pressurized working fluid to apply, for example, $\vec{F}_1$. Thus, as pressurized working fluid 225 is stored as part of the energy recovery process, a portion of that working fluid can be buffered to compel storage fluid 215 towards storage region 236. $\vec{F}_2$ may be implemented by a suitable mechanical energy storage device that opposes the $\vec{F}_1$. As pressure is drawn off in motor mode process 180, $\vec{F}_1$ may diminish or terminate. In either case, potential energy at the opposing end of the storage fluid column, when properly realized, can provide the energy for $\vec{F}_2$ to drive storage fluid back towards reservoir region 232. Thus, $\vec{F}_2$ may be realized by any suitable mechanism that implements an elastic bias, such as a spring or a suitable gas. The present invention is not limited to this configuration; other techniques may be used with the present invention to bring about the storage fluid flow without departing from the spirit and intended scope of the present invention.

Figure 4:
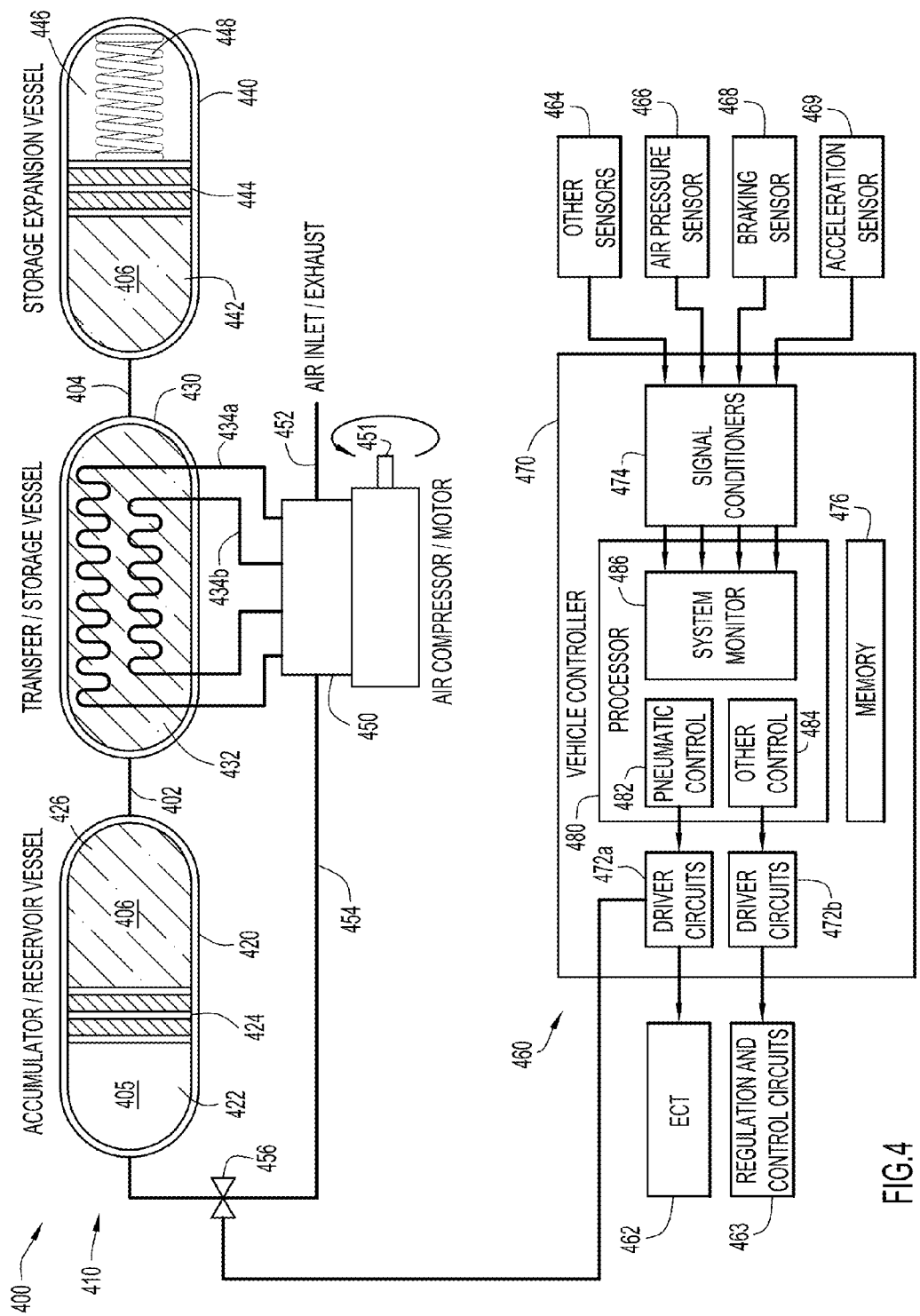
FIG. 4 is a schematic block diagram of a hybrid vehicle drive context in which the present general inventive concept can be embodied.

FIG. 4 is a schematic block diagram of an embodiment of a thermal energy recovery system 410 of the present invention incorporated into a pneumatic drive system 400 of a hybrid vehicle (not illustrated). In the exemplary pneumatic drive system 400, the working fluid is air 405 and the heat storage fluid is water 406, although the present invention is not restricted to these fluids. Thermal energy recovery system 410 includes an accumulator/reservoir vessel 420, heat transfer/storage vessel 430 and storage expansion vessel 440 that are interconnected by suitable piping 402 and 404. Together these components form the storage fluid conduit previously described; water 406 is displaced across the vessels 410, 430 and 440 between reservoir region 426, transfer region 432 and storage region 442 in the same manner as that generally described with reference to FIG. 2. In system 410, however, physical boundaries are imposed between the regions 426, 432 and 442, i.e., by the walls of vessels 420, 430 and 440. This division can beneficially isolate portions of water 406 thermodynamically, while piping 402, 404 provides the ability to move the water between vessels by forces applied at the ends of the water column, i.e., at interfaces 424 and 444, to compel a flow.

In thermal recovery system 410, the working fluid storage facility described as working fluid storage 160 in FIG. 1 is implemented in a common vessel, i.e., accumulator/reservoir vessel 420, with reservoir region 426. Accordingly, the accumulated volume of pressurized air applies the storage fluid motivating force, described as force $\vec{F}_1$ in FIG. 2. Thus, the functionality of the working fluid buffer 250 described in FIG. 2 is also implemented by accumulator/reservoir vessel 420. Pressure is applied to the air/water interface 424 and a volume of water 406 is displaced by a corresponding volume of air 405. Interface 424 may be a piston, bladder or other mechanism that moves under sufficient pressure. In certain embodiments, the air pressure in accumulator 405 can range from about 500 psig (about 3.447 MPa) to about 6,000 psig (about 41.37 MPa) or 8,000 psig (about 55.16 MPa), but the present invention is not limited to these ranges. At the other end of the water column, a spring 448 or other biasing mechanism is situated in space 446 of storage expansion vessel 440 and applies the force described in FIG. 2 as force $\vec{F}_2$ and interface 444 may be implemented by, for example, a piston. The spring coefficient of spring 448 should be chosen in accordance with the expected storage pressure in accumulator 422 to ensure proper flow and proper pressure on the water column to prevent a vapor phase transition within the temperature range of interest, i.e., the expected maximum temperature of the water.

Transfer/storage vessel 430 isolates the heat transfer region 432 from the reservoir region 426 and the storage region 442. A plurality of intercooler heat exchange tubes 434a and 434b, representatively referred to herein as heat exchange tube(s) 434, traverse the wall of transfer/storage vessel 430 to be placed in thermal contact with water 406 in heat transfer region 432. Heat exchange tubes 434 may be suitably constructed for efficient heat exchange, such as by implementing fins, coils, meanderings, or other structures that increase the surface area over which heat is exchanged by conduction between air 405 in heat exchange tubes 434 and water 406 within transfer/storage vessel 430.

As previously stated, in the example application illustrated in FIG. 4, pneumatic drive system 400 is incorporated into a hybrid vehicle. It is to be understood that the operational details of the vehicle in which pneumatic drive system 400 is incorporated is not essential to understanding the role of thermal recovery system 410 in that vehicle. However, description of certain functions of the vehicle are believed useful, particularly since the operation of thermal recovery system 400 is dependent on the process of the energy recovery cycle that pneumatic drive system 400 implements, i.e., regenerative braking, which, in turn, relates to operations of the vehicle that initiate those processes. Briefly, shaft 451 of compressor/motor 450 may be coupled to the main drive shaft (not illustrated) by means of an electrically-controlled clutch/transfer drive (ECT) 462 that is controlled by vehicle controller 470 in the vehicle's electrical system 460. ECT 462 is an abstraction of several devices that may be used to mechanically couple compressor/motor 450 with the drive shaft of the vehicle on demand and to make any speed or torque conversions between shaft 451 and the vehicle drive shaft. Again, the implementation details of the coupling of compressor/motor 450 with the vehicle drive train are not essential to practice the present invention. ECT 462 is engaged for the compressor mode during braking and for the motor mode for acceleration, subject to certain conditions, such as the availability of a sufficient amount of compressed air.

Vehicle electrical system 460 includes a number of sensors, a number of regulation and control circuits and a vehicle controller 470. The sensors may include an air pressure sensor 466 that monitors the air pressure in accumulator 422, a braking sensor that generates a signal when the vehicle's brake pedal is depressed to a certain level, an acceleration sensor 469 that generates a signal when the vehicle's accelerator pedal is depressed to a certain level, and other sensors 464 that monitor other vehicle functions. Control mechanisms may include an electrically operated air valve 456, ECT 462 and other regulation and control circuits 463 that operate various system components by way of control signals generated by vehicle controller 470. Vehicle controller 470 may include signal conditioning circuits 474 that, among other things, filter incoming signals and convert analog signals to digital data signals, and various drive circuits that, among other things, convert where necessary digital data signals to analog signals and amplify and buffer the electrical signals provided to the various regulation and control circuits. Vehicle controller 470 may also include a processor 480, which may be implemented in fixed or programmable logic including, but not limited to, application specific circuits, programmable logic arrays, microprocessors and microcontrollers. Memory 476 may provide storage for process data and, when processor 480 is a programmable microprocessor, processor instructions that when executed, perform various monitoring and control functions. Processor 480 may execute, either by fixed circuitry or by executing program code, system monitoring process 486 that continuously monitors available sensors for various conditions, pneumatic control process 482 that operates pneumatic drive system 400 and other control functions 484 to operate other various vehicle subsystems.

Figure 5:
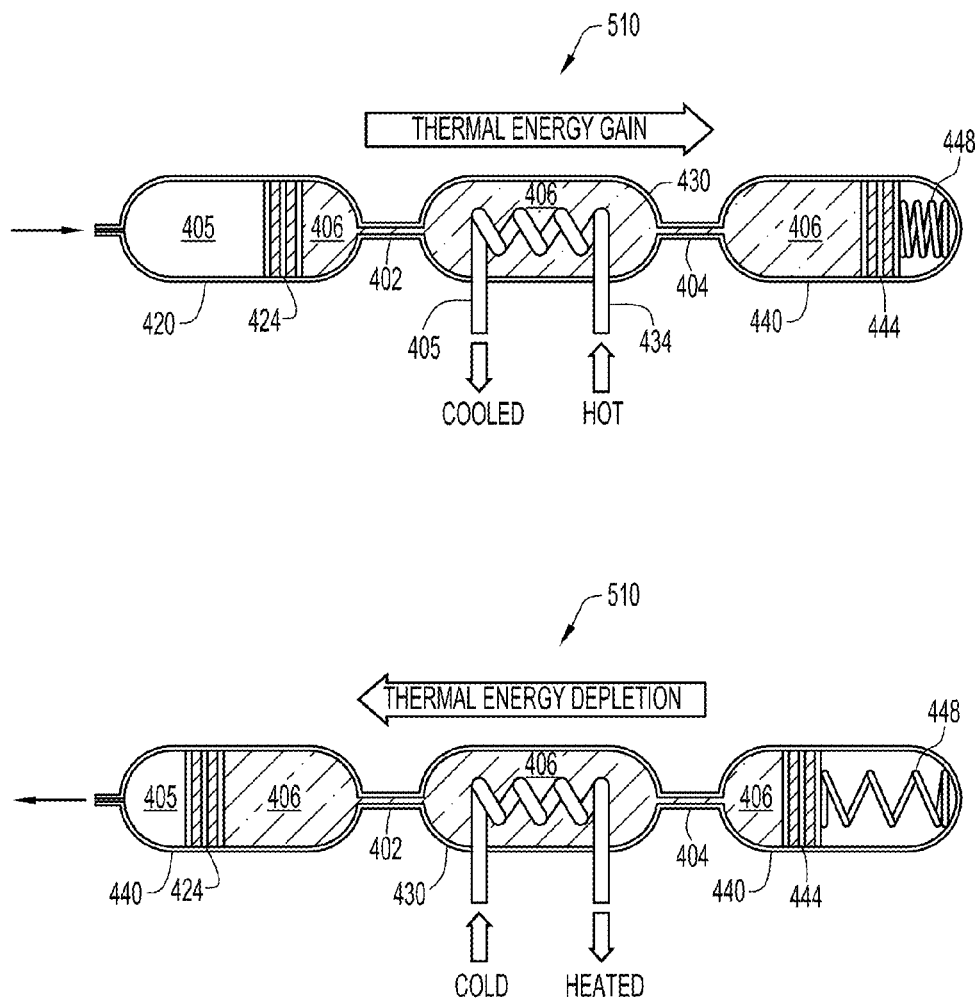
FIG. 5 is a diagram illustrating operation of a thermal energy recovery system in the hybrid vehicle drive of FIG. 4.

In operation, the hybrid vehicle may be operated as would any vehicle be operated. Inevitably, the vehicle operator will have to brake and, if the pressure on the brake pedal is above a certain threshold, as determined from braking sensor 468 and system monitor 486, then pneumatic drive system 400 is operated into the compressor mode and compressor mode process 170 may be initiated. Pneumatic control process 482 may generate a signal that operates ECT 462 to mechanically couple shaft 451 of compressor/motor 450 to the vehicle drift shaft. In response, ambient air is drawn into compressor/motor 450 through inlet 452 and compressed in stages as described with reference to FIG. 1. Pneumatic control process 482 may generate an additional signal that operates valve 456 into a state that allows air flow into accumulator 422 but not in the opposite direction. As air 405 is compressed, it passes through intercooler heat exchange tubes 430*a* and 430*b*, and heat is transferred to water 406 in transfer/storage vessel 430. The fully compressed air exits compressor/motor 450 through pressurized air line 454, through valve 456 and into accumulator 405. When sufficient air pressure is built, the air in accumulator 422 exerts sufficient for to displace interface 424 and with it, as illustrated more clearly by configuration 510 in FIG. 5, water 406 through piping 402 across heat exchange tube 434 in transfer/storage vessel 430 and into storage expansion vessel 440. The displacement of water 406 in storage expansion vessel 440 displaces interface 444 to compress spring 448. It is to be noted that countercurrent heat exchange, as described in FIG. 3, occurs in transfer/storage vessel 430.

In keeping with regenerative braking principles, the braking of the vehicle is achieved by transferring energy from the vehicle's drive train to do work on compressor/motor 450 by way of shaft 451. Accordingly, certain embodiments of the invention may determine, such as from the pressure on and duration over which the brake pedal is depressed, whether to engage, either partially, fully or not at all, the friction brakes of the vehicle.

At some point, vehicle controller 470 will terminate the regenerative braking and with it compressor mode process 180. This may occur when the brake pedal is released, when maximum air storage capacity is reached, or other conditions per the vehicle's design. Accordingly, pneumatic control process 482 may generate a signal to close valve 456 so that air can neither enter nor exit accumulator 422. Additionally, pneumatic control process 482 may generate another signal to disengage the vehicle drive from compressor/motor shaft 451 by way of deactivating ECT 462. Pneumatic drive system 400 will remain in this standby state until another braking event or until an acceleration event initiates a motor mode process 180.

At some point during vehicle operation, added power may be desired, such as when greater acceleration is called for. Accordingly, the vehicle operator may depress the accelerator pedal and a signal indicative of such will be generated by acceleration sensor 469. System monitor may determine if certain conditions are met prior to initiating motor mode process 180, such as to the manner in which the accelerator pedal was depressed, e.g., how rapidly and how far the pedal is depressed, and whether sufficient air is stored to meet the acceleration demand. The amount of pressurized air in accumulator 422 may be monitored by air pressure sensor 466. If all of the necessary conditions are met, processor 480 may initiate motor mode process 180. Pneumatic control process 482 may generate a signal to couple the vehicle's drive train to compressor/motor shaft 451 by engaging ECT 462. Pneumatic control process 482 may generate another signal to operate valve 456 into an open position that allows air 405 to flow out of accumulator 422, but not into accumulator 422. In response, air 405 flows out of accumulator 422, through valve 456 and air line 454, and into compressor/motor 450. Air 405 in compressor/motor 450 expands across the different stages, as described with reference to FIG. 1B, to rotate shaft 451. Air 405 traverses the stages through heat exchange tubes 434, where heat is transferred from heated water 406 in transfer/storage vessel 430 to air 405 in heat exchange tubes 434. The decompressed air exits compressor/motor 450 at exhaust port 452. Meanwhile, as air 405 exits accumulator 422, the lost volume allows spring 448 to expand to thereby displace interface 444. As illustrated in configuration 520 in FIG. 5, as interface 444 is moved, so too is water 406 in storage expansion vessel 440, in piping 404, in transfer/storage vessel 430, in piping 402 and in accumulator/reservoir vessel 420. The force of spring 448 is ultimately felt by interface 424 which is moved to displace the evacuated air. Upon termination of the acceleration event, either by, for example, removing pressure from the accelerator pedal or by virtue of insufficient air pressure to continue, motor mode process 180 is terminated by closing valve 456 and disengaging compressor/motor shaft 451 from the vehicle's drive train, such as by deactivating ECT 462.

Figure 6:
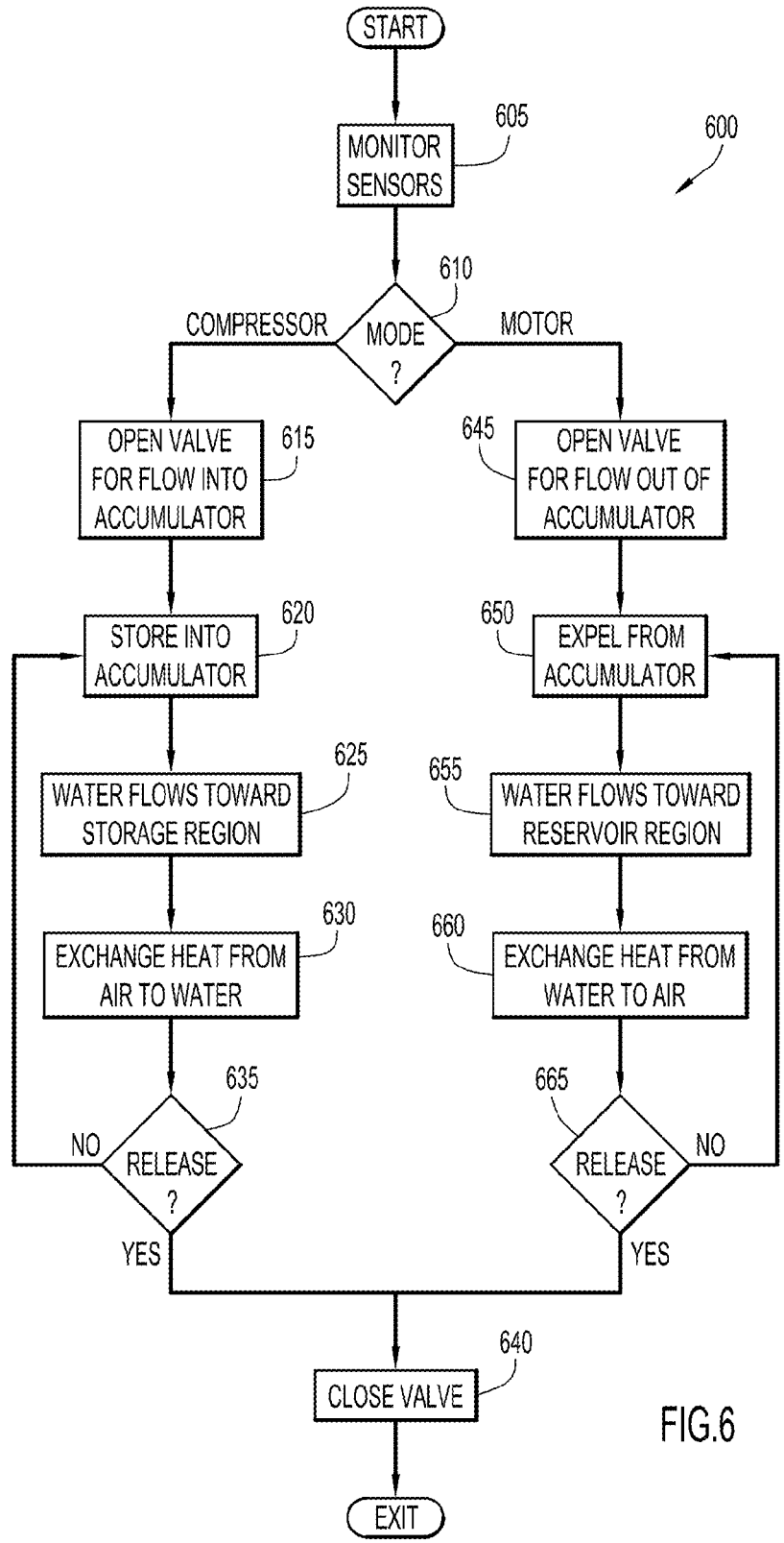
FIG. 6 is a flow diagram of thermal energy recovery process by which the present general inventive concept can be embodied.

FIG. 6 is a flow diagram of thermal energy recovery process 600 by which the present invention can be embodied, which again assumes air as the working fluid and water as the heat storage fluid. In operation 605, sensors are monitored various system conditions and/or events. In operation 610, it is determined whether criteria are met for either compressor mode process 170 or motor mode process 180. In the case of compressor mode, thermal energy process 600 transitions to operation 615, where a valve governing the flow into and out of an air storage accumulator is opened to allow air to flow into the accumulator, which occurs by operation 620. In operation 625, by the action of air entering the accumulator, water flows towards a heated water storage region and by the action of water flowing toward the storage region, heat is transferred in a transfer region from the air to the water. In operation, 635, it is determined whether the compressor mode process is released, i.e., has completed to the extent required by system conditions, and, if not, air continues to be stored at operation 620. If on the other hand the compressor mode process has been released, the air valve to the accumulator is closed.

If, in operation 610, it is determined that system conditions meet criteria for motor mode operation, the accumulator valve is opened in operation 645 to allow air flow out of the accumulator, which occurs in operation 650. By the action of air exiting the accumulator, water flows toward the reservoir region in operation 655 and by this action, heat is exchanged in the transfer region from the water to the air. In operation 665, it is determined whether the motor mode process is released and, if so, the accumulator valve is closed. If the motor mode process is not released, air continues to exit the accumulator at operation 650.

The descriptions above are intended to illustrate possible implementations of the present inventive concept and are not restrictive. Many variations, modifications and alternatives will become apparent to the skilled artisan upon review of this disclosure. For example, components equivalent to those shown and described may be substituted therefore, elements and methods individually described may be combined, and elements described as discrete may be distributed across many components. The scope of the invention should therefore be determined not with reference to the description above, but with reference to the appended claims, along with their full range of equivalents.

What is claimed is:

1. An apparatus comprising:
   an accumulator to buffer a working fluid over an energy recovery cycle that, by one process thereof, accumulates working fluid in the accumulator at increasing pressure and, by another process thereof, draws from the working fluid from the accumulator at decreasing pressure;
   a storage fluid conduit in communication with the accumulator and storing an amount of a heat storage fluid therein such that, in response to increasing pressure of the working fluid in the accumulator, the heat storage fluid is displaced within the storage fluid conduit to a heat storage region and, in response to decreasing pressure of the working fluid in the accumulator, the heat storage fluid is displaced within the storage conduit to a reservoir region; and
   at least one heat exchange conduit traversing a boundary of the storage fluid conduit to be in thermal contact with the heat storage fluid therein, the heat exchange conduit conveying the working fluid to transfer heat to the heat storage fluid during the process of the energy recovery cycle and to transfer heat from the heat storage fluid during the other process of the energy recovery cycle.

2. The apparatus of claim 1 further comprising:
   an accumulator/reservoir vessel to enclose the accumulator and reservoir region in common containment;
   an interface displaceable within the accumulator/reservoir vessel and mechanically separating the buffered working fluid and the heat storage fluid therein; and
   an expansion vessel applying mechanical force to the heat storage fluid in the heat storage region so that, in response to the decreasing pressure of the buffered working fluid in the accumulator/reservoir vessel, the heat storage fluid is motivated to the reservoir region by the applied mechanical force.

3. The apparatus of claim 2, wherein the expansion vessel includes an elastic biasing device that opposes motion of the heat storage fluid therein to apply the mechanical force.

4. The apparatus of claim 3, wherein the biasing device is a spring.

5. The apparatus of claim 3, wherein the biasing device is a quantity of compressible gas.

6. The apparatus of claim 2 further comprising:
   a valve at a working fluid entry port of the accumulator/reservoir vessel that prohibits flow of the working fluid in a closed position thereof, allows unidirectional flow of the working fluid into the accumulator/reservoir vessel in an open position and allows unidirectional flow of the working fluid out of the accumulator/reservoir in another open position.

7. The apparatus of claim 6 further comprising:
   a processor configured to:
      determine whether the process or the other process of the energy recovery cycle is initiated;
      generate a valve control signal to:
      compel the valve into the open position responsive to the determination that the process of the energy recovery cycle is initiated;
      compel the valve into the other open position responsive to the determination that the other process of the energy recovery cycle is initiated; and
      compel the valve into the closed position otherwise.

8. The apparatus of claim 1, wherein the working fluid is compelled to flow in the heat exchange conduit in a direction opposite to the flow of the heat storage fluid in both the process of the energy recovery cycle and the other process of the energy recovery cycle.

9. The apparatus of claim 1, wherein the at least one heat exchange conduit includes a plurality of heat exchange conduits traversing the boundary of the storage fluid conduit, where the working fluid in each of the heat exchange conduits are in a thermodynamic state distinct from the working fluid in the others of the heat exchange conduits.

10. An apparatus comprising:
   an accumulator/reservoir vessel to store a working fluid over an energy recovery cycle that, by one process thereof, accumulates the working fluid in an accumulator region of the accumulator/reservoir vessel at increasing pressure and, by another process thereof, draws from the working fluid from the accumulator region at decreasing pressure, the accumulator/reservoir vessel including a reservoir region to store a heat storage fluid therein, the reservoir region having an elastic boundary that remains in contact with both the working fluid in the accumulator region and the heat storage fluid as the pressure of the working fluid in the accumulator region increases and decreases;
   a storage expansion vessel storing the heat storage fluid in a heat storage region thereof, the heat storage region having an elastic boundary that remains in contact with the heat storage fluid as the heat storage fluid is displaced to occupy the reservoir region;

a transfer/storage vessel in fluid communication with the reservoir region of the accumulator/reservoir vessel and with the heat storage region of the storage expansion vessel, the transfer/storage vessel being in constant occupancy by the heat storage fluid as the heat storage fluid is displaced to occupy the reservoir region; and at least one heat exchange conduit traversing a boundary of the transfer/storage vessel to be in thermal contact with the heat storage fluid therein, the heat exchange conduit conveying the working fluid to transfer heat to the heat storage fluid during the process of the energy recovery cycle and to transfer heat from the heat storage fluid during the other process of the energy recovery cycle.

11. The apparatus of claim 10, wherein the elastic boundary of the storage expansion vessel is elastically biased in opposition to the displacement of the heat storage fluid into heat storage region to apply a force to the heat storage fluid towards the reservoir region of the accumulator/reservoir vessel.

12. The apparatus of claim 11, wherein a force on the heat storage fluid by the pressure of the working fluid in the accumulator region and the force on the heat storage fluid by the elastically biased boundary of the heat storage region combine to apply pressure to the heat storage fluid that is sufficient to raise a phase transition temperature of the heat storage fluid.

13. The apparatus of claim 10, wherein the at least one heat exchange conduit includes a plurality of heat exchange conduits traversing the boundary of the transfer/storage vessel, where the working fluid in each of the heat exchange conduits are in a thermodynamic state distinct from the working fluid in the others of the heat exchange conduits.

* * * * *